Feb. 6, 1934.     J. G. JACKSON     1,946,424
DIRECTION INDICATOR
Filed July 20, 1933
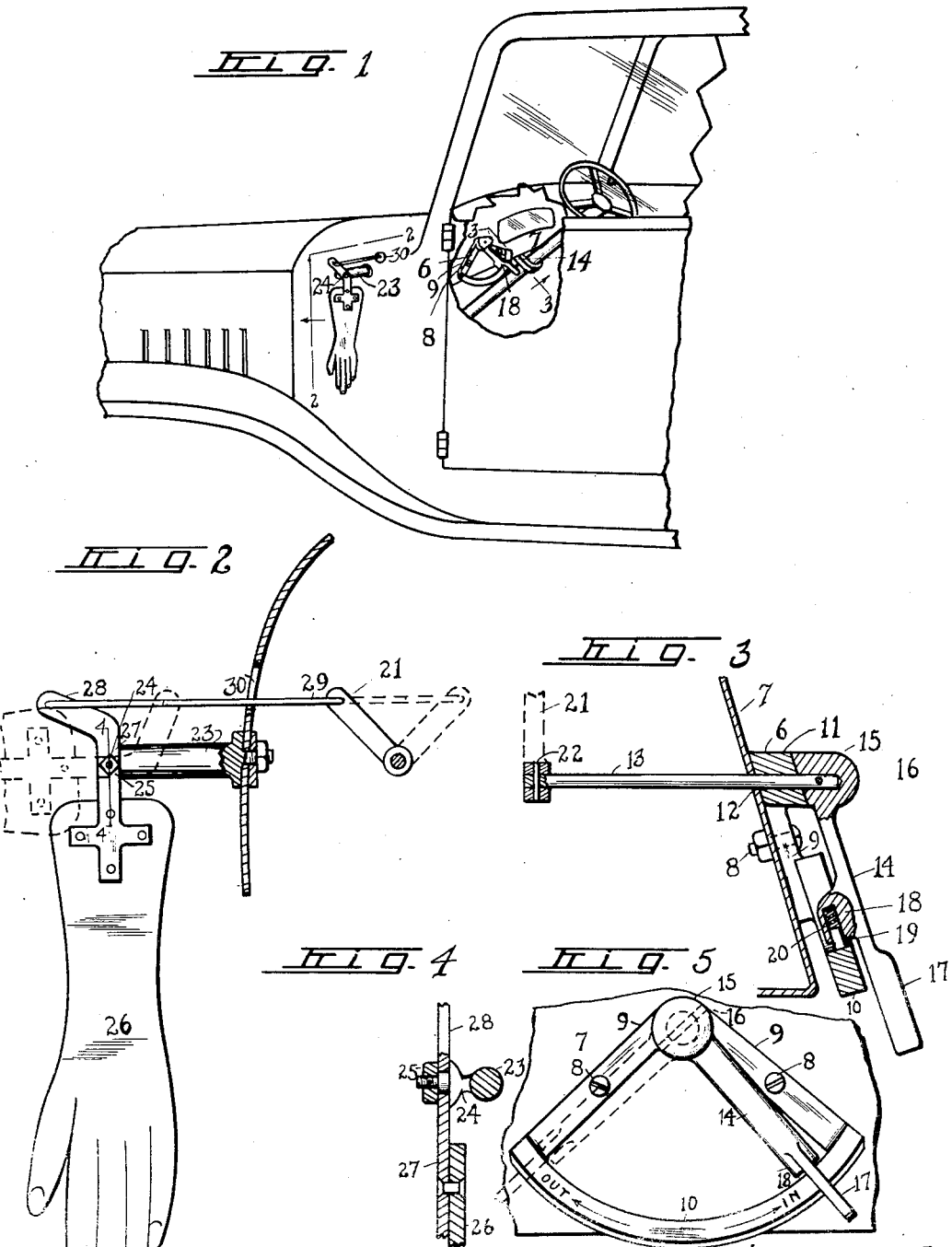
WITNESS
J. T. Mains
INVENTOR
John G. Jackson
BY
ATTORNEY Patented Feb. 6, 1934

1,946,424

UNITED STATES PATENT OFFICE 1,946,424

DIRECTION INDICATOR

John G. Jackson, Cleveland, N. Y.

Application July 20, 1933. Serial No. 681,358

2 Claims. (Cl. 116—51)

The present invention relates to vehicle signals intended to be mounted upon automobiles for the purpose of permitting a driver to signal intended manœuvres to other drivers without extending his hand from the car.

The object of the invention is to provide an extremely simple and inexpensive device which will be positive in operation and convenient for the driver to use.

Another object is to provide such a device which will attract the attention of other drivers. This is accomplished by forming the signal proper in the form of a human hand. Inasmuch as drivers generally are accustomed to seeing another driver indicate his intentions by means of his extended hand, this form of signal will attract attention and cause other drivers to observe the signal.

In the accompanying drawing:

Figure 1 is a perspective view of a portion of an automobile showing the device mounted thereon.

Figure 2 is a view taken on line 2—2 of Figure 1, the device proper being shown partly in section.

Figure 3 is a sectional view taken on the line 3—3 of Figure 1.

Figure 4 is a sectional view taken on the line 4—4 of Figure 2.

Figure 5 is an elevation of the operating handle and its support, showing the method of mounting.

Describing the drawing more particularly, the numeral 6 designates generally a supporting member which is secured to the dashboard 7 of an automobile, as by the bolts 8. The supporting member 6 is substantially V-shaped, having legs 9, which legs are connected by an arcuate member 10. At the apex of the V and connecting the legs is a boss 11 having a bore 12 therein. A shaft 13 is revolubly mounted in the bore 12, which shaft extends from a point outside the boss 11 through the boss and dashboard to a point behind the dashboard and beneath the cowl of the automobile. An operating handle having a stem 14 and an enlarged portion 15 is mounted upon the outer end of the shaft 13 and may be secured thereto as by a pin 16. The handle swings in a plane between the two legs 9, and extends downwardly from its point of connection with the shaft 13. The stem 14 has a grip portion 17 extending over the arcuate member 10 and an inward projection 18, the face of which moves closely adjacent the inner edge of the said member 10 in an arc parallel thereto, as shown in Figure 3.

An outwardly spring-pressed plunger 19 is mounted on a socket 20 in the projection 18 and frictionally engages the inner surface of the member 10 to hold the handle against accidental movement due to shocks incident to the travel of the automobile.

Upon the other end of the rod 13 and at a right angle to its axis an upwardly extending crank 21 is mounted, and secured as by a pin 22.

On the outside of the automobile body at a point substantially opposite to the crank 21, a standard or support 23 is mounted. This standard supports the signalling member which is pivoted thereto at its outer end by means of a stud 24 carrying a nut 25.

The signalling member is of the semaphore type having a target portion 26, preferably formed in imitation of a human hand, and a reduced extension 27 suitably secured to the target and acting to support it. The extension 27 is pivoted to the support 23 upon the stud 24.

The free terminal portion 28 of the extension 27 is bent outwardly from the automobile body, at a point on the opposite side of the pivot from the target 26 in order to form a crank for the operation of the semaphore. A link 29, passing through a suitable opening 30 in the automobile body, operatively connects the bent portion 28, near its free extremity, to the free end of the crank 21 beneath the cowl.

The operation of the device will be obvious from the foregoing description. When the driver wishes to signal a turn, stop or other intended change, he grasps the grip 17 and swings the handle to the left or clockwise, causing a corresponding movement of the crank 21 to the right or clockwise, due to the mounting of these elements below and above the shaft 13, respectively. The clockwise swinging of the crank 21, through the link 29 will cause a corresponding swinging of the extension 27 upon the pivot 24 and the target will be moved outwardly and upwardly, making an arresting and clearly discernable signal. The spring friction device 19 prevents the accidental operation of the signal but permits its intended operation without the necessity of unlatching or otherwise releasing it.

Due to the relative mounting of the handle 14 and the crank 21 on the lower and upper side of the shaft 13, the handle may be mounted in the position on the dashboard most convenient to the driver's hand, while the semaphore may be mounted upon the car body at the point most conspicuous to other drivers and at the approximate point drivers have become accustomed to watching for signals. It will be apparent from the small number of parts and from their extreme simplicity that the device is very inexpensive and easy to construct and install. It will also be apparent that its action will be positive since all of the elements are positively connected. The ease with which it may be operated is advantageous in that drivers are not apt to neglect making signals when they may be made so easily.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. A vehicle signal comprising a substantially V-shaped supporting member having an arcuate member connecting the legs thereof mounted upon the dashboard of an automobile, a shaft extending through the supporting member at its apex and through the dashboard to a point beneath the cowl of the automobile, a swinging operating handle mounted at one end upon the outer end of the shaft and movable between the legs of the supporting member, spring pressed means for frictionally securing the handle in the position in which it is placed, a crank mounted upon the opposite end of the shaft and upon the side of the shaft opposite to that on which is the operating handle, a link connected at one end to the crank and extending to a point outside of the automobile body, and a semaphore having a relatively broad signalling portion and a narrower supporting portion, the narrower portion being pivoted at a median point to a standard mounted upon the automobile body, and being connected at its extremity with the outer end of the link.

2. A vehicle signal comprising a support projecting from the side of an automobile, a signalling semaphore having an extension projecting therefrom, the end portion of the said extension being offset at an angle and said extension being pivotally connected at a point between its offset portion and the semaphore with the support, a swinging operating handle mounted upon the dashboard of the automobile, a crank positioned within the automobile at a point opposite the semaphore and operable by the handle, and a link extending through the side of the automobile and connecting the said crank and the offset portion of the extension of the semaphore.

JOHN G. JACKSON.